United States Patent Office 2,965,743
Patented Dec. 20, 1960

2,965,743

SUBMERGED ARC WELDING

Robert Arthur Cresswell, Tadworth, England, assignor to The British Oxygen Company Limited, a British company No Drawing. Filed Aug. 22, 1958, Ser. No. 756,548

Claims priority, application Great Britain Aug. 22, 1957

1 Claim. (Cl. 219—73)

This invention relates to submerged arc welding. In this process of welding a continuous bare wire electrode is fed progressively to a welding arc struck between the tip of the electrode and a workpiece beneath a blanket of granular flux. This process enables heavy deposits of weld metal of good metallurgical quality to be deposited.

The welding speed in this process is largely dependent upon the burn-off rate of the electrode, and it has been suggested that the burn-off rate could be increased by making use of the electrical resistance heating effect of the welding current flowing through the electrode. This may be done by increasing the distance which the electrode extends beyond the current contact means for the electrode from the conventional value of about one to one and a half inches up to values in excess of two inches and possibly as large as eight inches. If it is arranged that the tip of the electrode is raised to temperatures in the region of its melting point by electrical resistance heating as it enters the arc it is found that the burn-off rate depends upon the cube of the welding current as compared with direct proportionality under normal welding conditions. Particularly high deposition rates are thus obtainable with the process as improved by this prior suggestion, but if good metallurgical properties are to be obtained it is desirable that any alloying and deoxidising materials should be intimately mixed in the molten weld metal in the immediate vicinity of the arc.

One disadvantage of the improved process is that for the welding of alloys it is necessary to use electrode wires of the appropriate composition, which are often expensive and difficult to obtain, or to incorporate alloying elements and, possibly, deoxidants, in the granular flux used to blanket the arc, a course which has certain technical disadvantages particularly in high speed welding. It is an object of the present invention to provide a method of welding which is not subject of these disadvantages.

According to the present invention, in a method of submerged arc welding, particularly for alloy steels, in which use is made of the electrical resistance heating effect of the welding current flowing in the welding electrode to heat the electrode tip to a high temperature by arranging that the electrode extends at least two inches beyond the current contact means for the electrode, use is made of an electrode of tubular form comprising a metallic sheath enclosing a core of finely divided alloying material and deoxidising material and, optionally, arc stabilising material.

The invention thus allows the alloying and deoxidising material to be introduced where required directly to the arc so that effective mixing with the molten weld metal is assured. The blanket of flux may therefore be provided by a relatively cheap finely divided slag forming material without alloying additions and deoxidants.

In carrying the invention into practice, a conventional submerged arc welding apparatus may be used. Such apparatus comprises, for example, a flux hopper for depositing a layer of flux on the workpiece ahead of the point of welding, a reel on which a supply of electrode can be coiled, and means for continuously feeding the electrode through electrical contact means towards the workpiece. A power supply circuit is connected between the contact means and the workpiece to supply alternating or direct welding current, and the apparatus is mounted on a carriage, for example, for movement along the line of weld during the welding operation.

In operating the method of the invention, the apparatus is adjusted so that the distance of the contact means from the work is at least two inches plus the desired arc length from the workpiece, and an arc is then struck between the tip of the electrode and the workpiece beneath a layer of finely divided flux deposited from the hopper. The welding current density should be at least 50,000 amperes per square inch in the electrode, and should be chosen in conjunction with the extension of the electrode beyond the contact means so that the tip of the electrode is raised to the region of its melting point as it is fed to the arc. The electrode comprises a metallic sheath to which welding current can be fed by the contact means, and a core of compacted finely divided alloying and deoxidising material selected for its suitability for the welding operation being performed. Thus in the welding of low alloy steels the tubular electrode may have a sheath of mild steel enclosing a core comprising a homogeneous mixture of the appropriate alloying material and deoxidant material. For some applications the core material may be constituted by a ferro-alloy, and in the welding of a low alloy manganese steel the ferro-alloy may consist of ferro-manganese. Arc stabilising materials such as titanium or potassium compound may also be included.

In some applications of the invention it may be necessary to provide in the apparatus means for guiding the electrode from the contact means to the arc. Such means may comprise a tubular guide member of a refractory material such as aluminous porcelain, bonded zirconia, sillimanite, mullite, or silicon nitride or heat resisting alloys, and will be insulated from the contact means.

Although sufficient molten metal may be supplied to fill the weld preparation there may be insufficient heat available using a single electrode to allow full fusion into the workpiece. In such cases a non-consumable electrode preheating arc may be used ahead of the consumable electrode to maintain a high welding speed. Alternatively more than one consumable electrode may be used, the leading electrode having welding current conducted to it at the conventional distance from the electrode tip and the following electrode or electrodes having this distance, i.e. the extension, increased to make use of the resistance heating effect and deposit weld metal at an increased rate.

Where two or more electrodes are used they may be spaced at such a distance and may be so directed that the mechanical force on the electrode tips due to the magnetic fields set up by the welding current flowing through the electrodes and the welding arcs assists in guiding the molten or nearly molten weld metal towards the workpiece. Thus, for example, two electrodes having D.C. welding current flowing through them may be arranged parallel to one another so that the mechanical force due to the welding current directs the molten or nearly molten weld metal into a relatively narrow weld pool.

I claim:

A method of welding alloy steels of a metallurgical composition which cannot be drawn into alloy steel wire which includes supplying welding current to continuously fed consumable electrode which is characterised firstly in the use of an electrode of tubular form consisting of a metallic sheath of mild steel enclosing a core consisting of a flux-free mixture of finely divided alloying and deoxidising material, secondly in that welding current is supplied to the electrode at a point spaced at least two inches from the tip of the electrode and spaced such that the metallic electrode sheath in the region of the electrode tip is raised to a temperature closely approaching its melting point, and thirdly in that the arc and the electrode tip are submerged under a layer of granulated flux during welding, whereby the finely-divided core material is delivered in a heated condition to the centre of the arc zone and is thus effectively mixed in the deposited weld metal.

References Cited in the file of this patent

UNITED STATES PATENTS

| | | |
|---|---|---|
| 1,495,272 | Stresan | May 27, 1924 |
| 2,475,835 | Hehenkamp | July 12, 1949 |
| 2,655,586 | Schreiner et al. | Oct. 13, 1953 |
| 2,721,249 | Landis et al. | Oct. 18, 1955 |
| 2,868,948 | Webb | Jan. 13, 1959 |

FOREIGN PATENTS

| | | |
|---|---|---|
| 762,170 | Great Britain | Nov. 21, 1956 |
| 1,142,934 | France | Apr. 8, 1957 |
| 787,910 | Great Britain | Dec. 18, 1957 |

OTHER REFERENCES

Welding Engineer, May 1957, pages 41–42.